United States Patent [19]

Ushiki et al.

[11] Patent Number: 5,438,356
[45] Date of Patent: Aug. 1, 1995

[54] ACCOUNTING SYSTEM FOR MULTIMEDIA COMMUNICATIONS SYSTEM

[75] Inventors: Kazumasa Ushiki; Mitsunori Fukazawa; Masaaki Wakamoto, all of Kawasaki, Japan

[73] Assignee: Fujitsu Limited, Kanagawa, Japan

[21] Appl. No.: 63,916

[22] Filed: May 19, 1993

[30] Foreign Application Priority Data

May 18, 1992 [JP] Japan ................... 4-149896

[51] Int. Cl.$^6$ ............................................. H04N 7/14
[52] U.S. Cl. ...................... 348/12; 348/13; 348/584; 395/154; 364/406
[58] Field of Search ............ 348/6, 7, 8, 9, 10, 348/12, 13, 14, 15, 16, 563, 564, 565, 585, 588, 705, 584; 395/153, 154, 200, 161; 364/406, 401; H04N 7/10, 7/16, 7/167, 7/173; 358/84, 85, 86; 379/111-115, 53, 54

[56] References Cited

U.S. PATENT DOCUMENTS

| | | | |
|---|---|---|---|
| 4,850,007 | 7/1984 | Morino et al. | 379/67 |
| 5,027,400 | 6/1991 | Boji et al. | 380/20 |
| 5,233,423 | 8/1993 | Jernigan et al. | 348/565 |
| 5,305,195 | 4/1994 | Murphy | 364/401 |

FOREIGN PATENT DOCUMENTS

| | | | |
|---|---|---|---|
| 0176373 | 9/1985 | Japan | 358/183 |
| 0039687 | 2/1986 | Japan | 358/183 |
| 0017553 | 1/1989 | Japan | |

*Primary Examiner*—James J. Groody
*Assistant Examiner*—David E. Harvey

[57] ABSTRACT

In an accounting system for a multimedia communications system, an additional information storage unit stores additional information to be supplied to subscriber terminals in the multimedia communications system by one or a plurality of additional information suppliers. An additional information adding unit adds the additional information to communication information transmitted between subscriber terminals communicating with each other. A measurement unit measures a degree of supply of the additional information supplied to at least one of the subscriber terminals communicating with each other. A database unit stores accounting information used to calculate a fee for a communication between the subscriber terminals communicating with each other. A control unit calculates the fee for the communication between the subscriber terminals communicating with each other on the basis of the accounting information and the degree of supply of the additional information measured by the measurement unit.

33 Claims, 24 Drawing Sheets

F I G. 4

| SUBSCRIBER | ... | TERMINAL TYPE | ... | SUPPLIER SELECTING INFORMATION | | INFORMATION SENDING PATTERN | OFFICE FROM WHICH ADDITIONAL INFORMATION SHOUD BE SUPPLIED |
|---|---|---|---|---|---|---|---|
| | | | | NAME | ACCUMMULATED RECEIVING TIME | | |
| A | | AV | | X | 1 | P1/P3 | CALLING OFFICE |
| B | | A/AV | | X | 2 | P1/P3 | CALLED OFFICE |
| ... | | | | | | | |

FIG. 5

NORMAL ACCOUNTING TABLE

| QUANTITY OF INFORMATION | AMOUNT |
|---|---|
| ~10 | 10 |
| ~20 | 25 |
| ⋮ | |

F I G. 6

DISCOUNT TABLE

| SUPPLIER X | | | |
|---|---|---|---|
| TERMINAL | | DISCOUNT RATE | |
| CALL | CALLED | LESS THAN ONE HOUR IN RECEIPT | MORE THAN ONE HOUR IN RECEIPT |
| A | A | 0 | 0 |
| A | AV | 5 | 7 |
| AV | A | 5 | 7 |
| AV | AV | 10 | 15 |

A : AUDIO TERMINAL
AV : MULTIMEDIA TERMINAL

FIG. 7

ADDITIONAL INFORMATION
SUPPLIER SETTING TABLE

| ZONE | TIME RANGE | SUPPLIER |
|---|---|---|
| α | IN THE MORNING | X |
| α | IN THE AFTERNOON | Y |
| β | IN THE MORNING | X |
| β | IN THE AFTERNOON | Z |
| ⋮ | | |

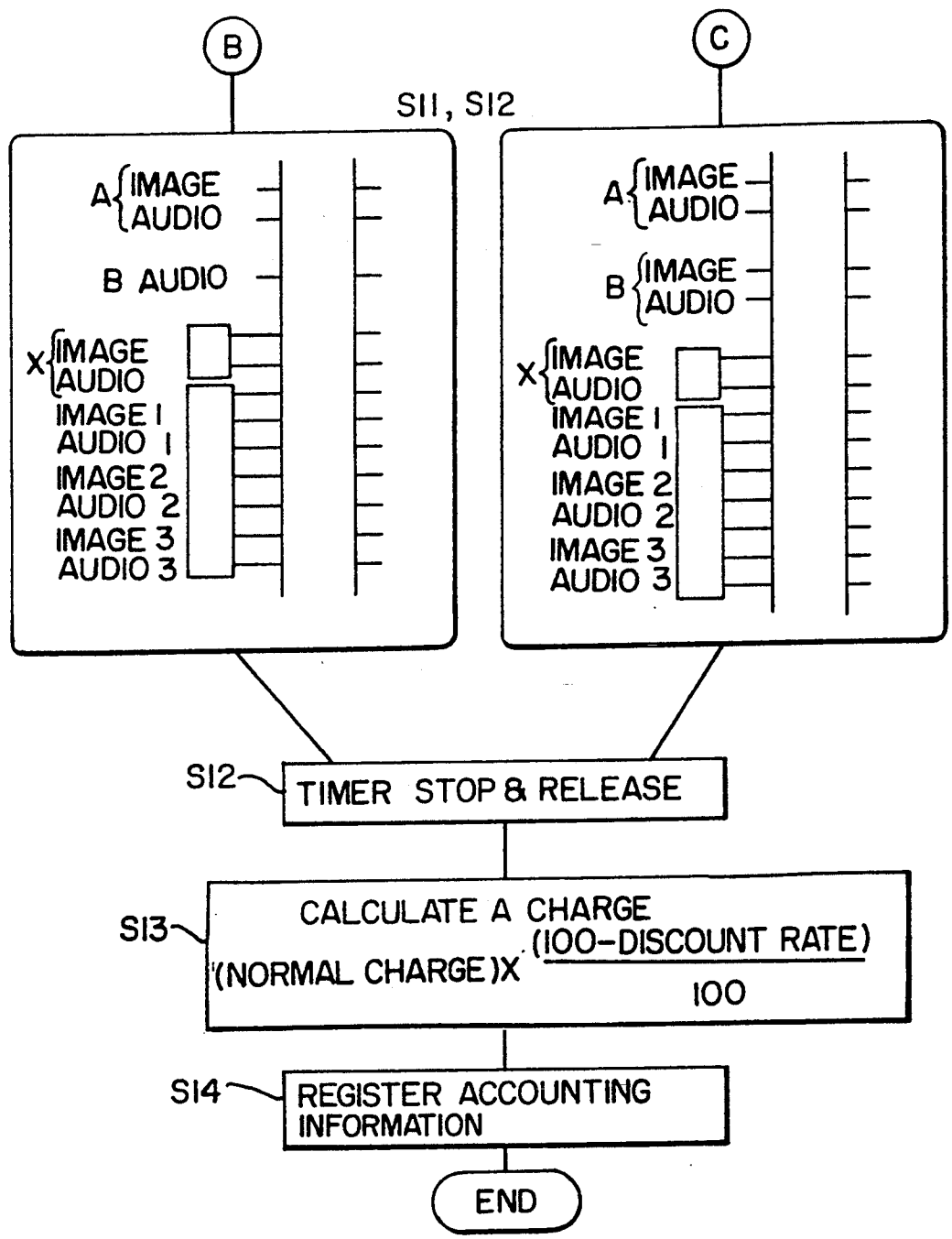
F I G. 10

FIG. 22

DISPLAY-SIZE-BASED
DISCOUNT TABLE

| DISPLAY SIZE (%) | DISCOUNT RETE (%) |
|---|---|
| 1 0 0 | 1 0 0 |
| . . | . . |
| 5 0 | 5 0 |
| . . | . . |
| 2 5 | 2 5 |
| . . | . . |

ACCOUNTING SYSTEM FOR MULTIMEDIA COMMUNICATIONS SYSTEM

BACKGROUND OF THE INVENTION

1. Field of the Invention

The present invention relates to an accounting system for a multimedia communications system.

2. Description of the Prior Art

It is expected that a multimedia communications system based on a broad-band communications technique becomes actualized in the near future. In such a multimedia communications system, it is possible to transmit not only speech information but also video information. It is possible to add information provided by a third party to communications information between subscribers (see Japanese Laid-Open Patent Application No. 64-17553). Such additional information provided by the third party may be, for example, an advertisement relating to the third party.

In the multimedia communications system, a large amount of data can be transmitted. Hence, the charge for transmitting such a large amount of data will be very expensive according to the existing accounting systems. This will prevent practical use of the multimedia communications. Hence, an improved accounting system is desired for reducing the payment by the subscribers so that the subscribers utilize the multimedia communications services.

A conventional accounting system for charging payment for use of a communication medium (a communication line or channel) is based on the amount of information to be transmitted, the time needed for a communication, the time when the communication takes place (in the daytime or nighttime), and the area in which the remote terminal is located. Normally, the calling subscriber is required to pay the charge accounted by the above conventional accounting system.

As has been described previously, a large amount of data can be transmitted via the multimedia communications system. If the above conventional accounting system is applied to the multimedia communications system, the calling subscriber will be charged a large amount of money. Further, it will be expected that a company which provides multimedia communications services charges a high fee in order to defray the cost of constructing the multimedia communications system and the cost for maintaining the system. The above situations will prevent practical general use of multimedia communications services.

SUMMARY OF THE INVENTION

It is a general object of the present invention to provide an improved accounting system for a multimedia communications system in which the above disadvantages are eliminated.

A more specific object of the present invention is to provide an accounting system for a multimedia communications system in which advertisement information can be added to information between subscribers and a company providing such advertisement information is charged a part of the communication cost. According to the present invention, it becomes possible to facilitate practical use of multimedia communications systems.

The above objects of the present invention are achieved by an accounting system for a multimedia communications system comprising:

additional information storage means for storing additional information supplied to subscriber terminals in the multimedia communications system by one or a plurality of additional information suppliers;

additional information adding means for adding the additional information to communication information transmitted between subscriber terminals communicating with each other;

measurement means for measuring a degree of supply of the additional information supplied to at least one of the subscriber terminals communicating with each other;

database means for storing accounting information used to calculate a fee for a communication between the subscriber terminals communicating with each other; and control means for calculating the fee for the communication between the subscriber terminals communicating with each other on the basis of the accounting information and the degree of supply of the additional information as measured by the measurement means.

BRIEF DESCRIPTION OF THE DRAWINGS

Other objects, features and advantages of the present invention will become more apparent from the following detailed description when read in conjunction with the accompanying drawings, in which:

FIG. 4 is a diagram illustrating an individual information table;

FIG. 5 is a diagram illustrating a normal accounting table;

FIG. 6 is a diagram illustrating a discount table;

FIG. 7 is a diagram illustrating an additional information supplier setting table;

FIGS. 8, 9 and 10 are flowcharts of the operation of the first embodiment of the present invention;

FIG. 22 is a diagram illustrating a display-size-based discount table used in a third embodiment of the present invention;

DESCRIPTION OF THE PREFERRED EMBODIMENTS

Figure 1:
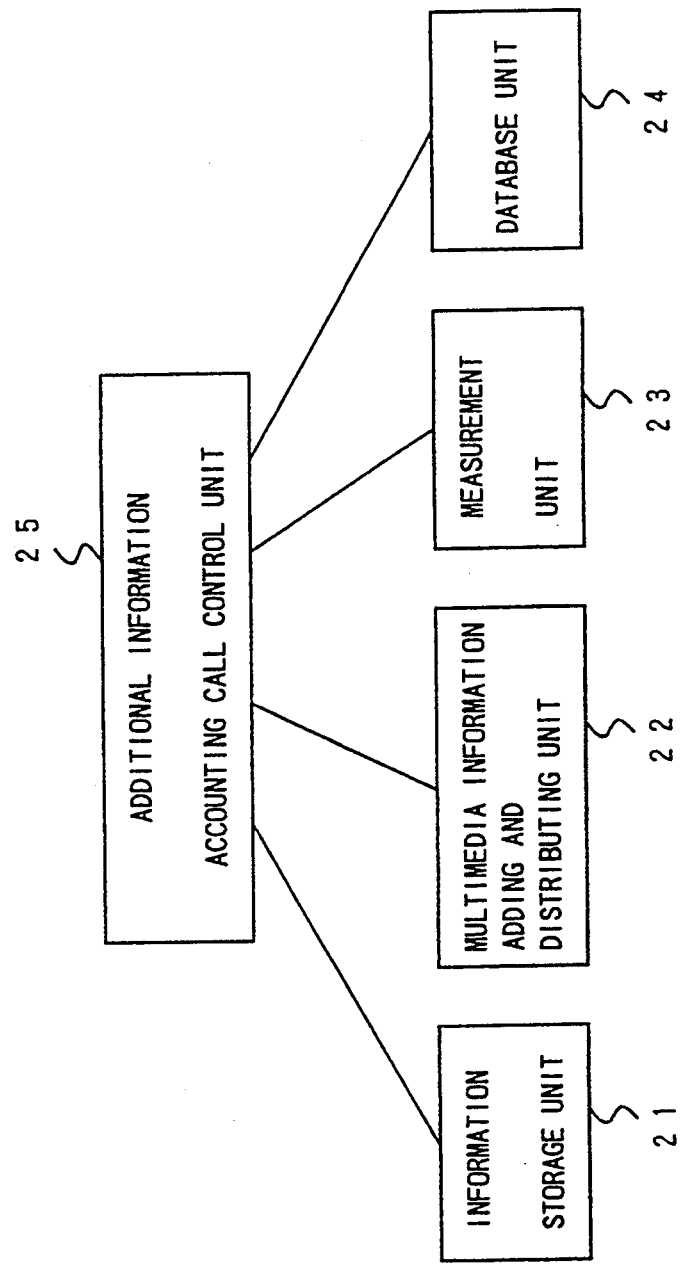
FIG. 1 is a block diagram illustrating an overview of a first embodiment of the present invention.

FIG. 1 illustrates an overview of an accounting system according to a first embodiment of the present invention. The accounting system shown in FIG. 1 includes an information storage unit 21, a multimedia information adding and distributing unit 22, a measurement unit 23, a database unit 24 and an additional information accounting call control unit 25.

The information storage unit 21 stores additional information such as advertisement information provided to subscribers by a third party. The multimedia information adding and distributing unit 22 adds a desired piece of the additional information stored in the information storage unit 21 to communications information transmitted between subscribers, and distributes the additional information to a plurality of subscribers. The measurement unit 23 measures a degree of supply of the additional information provided to the subscribers by the third party. For example, the degree of supply of the additional information is the amount of the additional information actually provided to the subscribers or the time it takes to provide the additional information to the subscribers. The database unit 24 stores accounting information referred to for accounting. The call control unit 25 integrally controls the units 21-24. The call control unit 25 determines a fee to be charged to the calling (or called) subscriber, taking into account the degree of supply of the additional information measured by the measurement unit 23 as well as the accounting information stored in the database unit 24.

Figure 2:
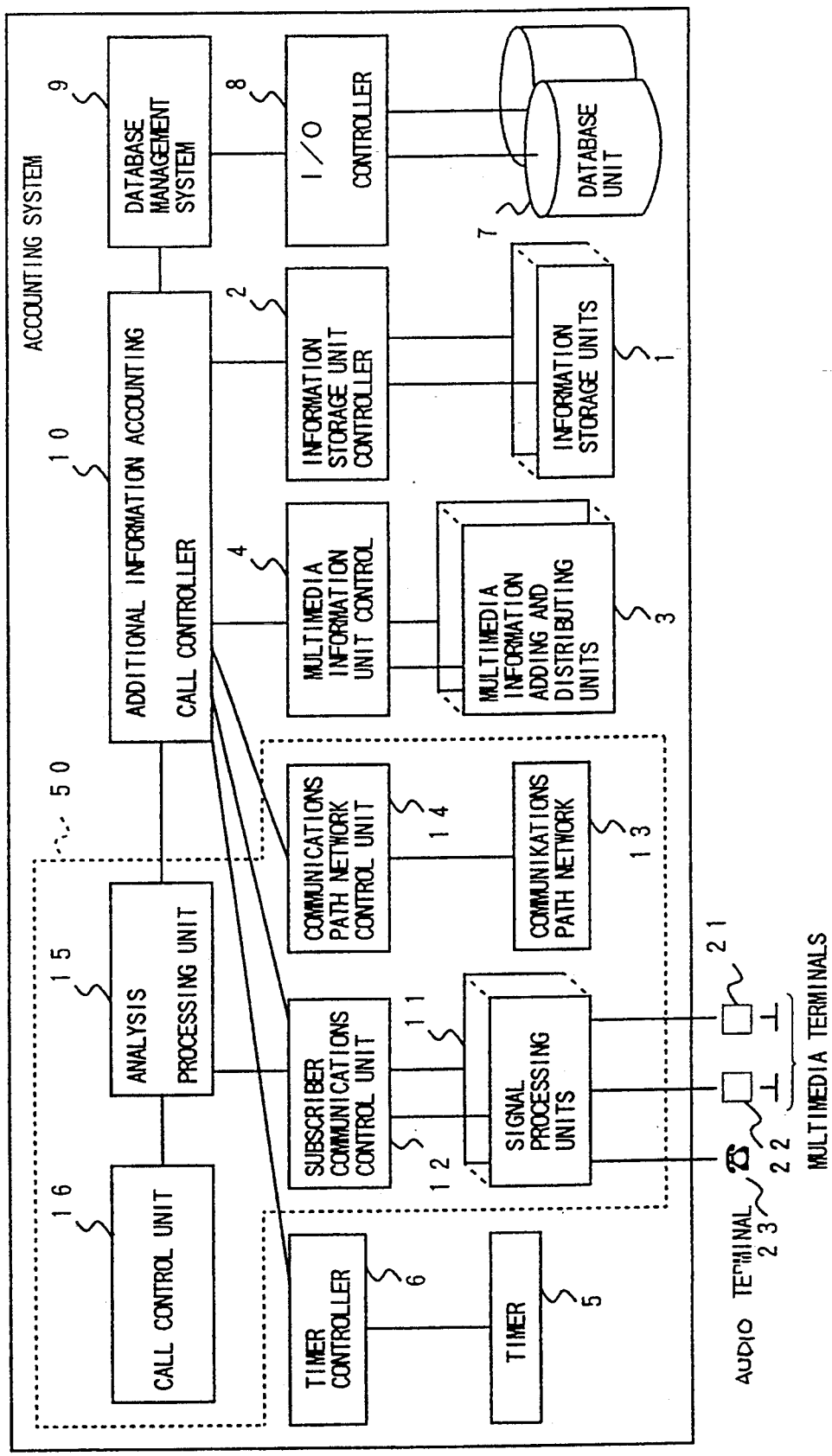
FIG. 2 is a block diagram illustrating an accounting system according to the first embodiment of the present invention.

FIG. 2 shows the structure of the accounting system according to the first embodiment of the present invention in more detail. The structure shown in FIG. 2 is integrated with an exchange system made up of signal processing units 11, a subscriber communications control unit 12, a communication path network 13, a communications path network controller 14, an analysis processing unit 15 and a call controlling unit 16. Various types of terminals, such as multimedia terminals 21 and 22, and a telephone set (an audio terminal) 23, are respectively connected to the signal processing units 11. Structural elements other than the above units 11-16 configure an additional information accounting system according to the first embodiment of the present invention.

The signal processing units 11 accommodate the subscriber terminals 21, 22 and 23. The subscriber communications control unit 12 controls the signal processing units 11. The communications path network control unit 14 controls the communications path network 13 connecting the subscribers to each other. The analysis processing unit 15 analyzes various information sent from the terminals. The call controlling unit 16 performs a normal or conventional accounting operation and a normal call control process.

Information storage units 1 store multimedia information serving as additional information. The multimedia information includes speed and/or video information, and is supplied via a speaker and/or a display of each subscriber. The video information includes still picture images and dynamic images. The multimedia information can be provided by one or a plurality of third parties. The information storage units 1 are controlled by an information storage control unit controller 2.

Multimedia information adding and distributing units 3 have the function of adding additional information to communications information transmitted between subscribers, and of distributing additional information to a plurality of subscribers. The multimedia information adding and distributing units 3 are controlled by a multimedia information adding and distributing unit controller 4.

A timer 5 is used to measure a receiving time indicating the time required for the additional information to be provided to the subscriber(s) by a third party. The receiving time measured by the timer 5 is referred to when the fee for a communication between subscribers is calculated. The timer 5 is controlled by a timer controller 6.

A database unit 7 stores information referred to in order to realize flexible accounting for communications between subscribers. The information stored in the database unit 7 includes an individual information table shown in FIG. 4, and base information for accounting. The base information for accounting includes a normal accounting table shown in FIG. 5, a discount table shown in FIG. 6 and provided for each additional information supplier, and additional information supplier table shown in FIG. 7.

The individual information table shown in FIG. 4 includes the following information for each of subscribers A, B, . . . . Terminal type information indicates the types of terminals of the subscribers. A symbol "AV" denotes a multimedia terminal capable of processing speech information and video information. A symbol "A" denotes an audio terminal capable of handling only speech information. Advertisement information supplier selecting information indicates the name of each supplier, and an accumulated receiving time. Information transmitting pattern information indicates patterns P1, P2, P3, . . . , which patterns will be described later. Advertisement information supplier receiving office information indicates a terminal to which additional information should be supplied. According to the table shown in FIG. 4, additional information should be supplied from the calling office with respect to the subscriber A and should be supplied from the called office with respect to the subscriber B. In the first embodiment of the present invention, the calling office and the called office are the same as each other.

Referring to FIG. 7, the table indicates the additional information suppliers to be selected on the basis of subscriber zones and time range. For example, in an area α, the additional information supplier X is selected in the morning and the additional information supplier Y is selected in the afternoon.

Each subscriber can specify the following first, second and third pieces of information concerning the additional information suppliers. The first specified information is used to specify one or a plurality of additional information suppliers which are allowed to supply additional information to respective subscriber. The second specified information is a default specification defined for each additional information supplier, and indicates an area and/or a time zone in which additional information can be supplied. The third specified information indicates rejection of receipt of additional information from one or a plurality of additional information suppliers.

Returning now to FIG. 2, a database management system 9 receives a request from an additional information accounting call controller 10, and performs a searching operation on the database unit 7 and an updating operation thereon. An I/O controller 8 directly operates the database unit 7 in order to perform the request.

Figure 3:
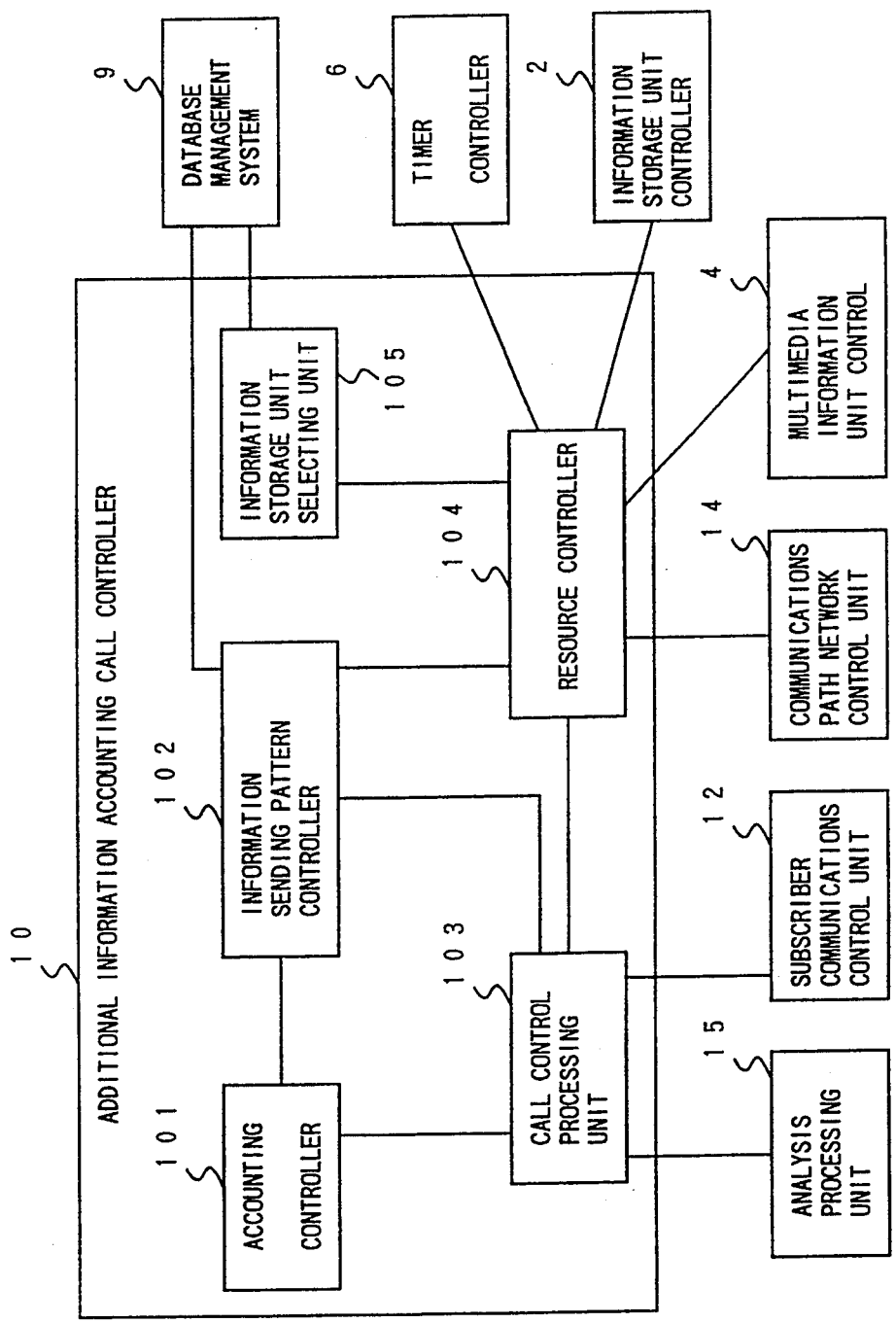
FIG. 3 is a block diagram illustrating an essential part of the accounting system shown in FIG. 2.

FIG. 3 shows the structure of the additional information accounting call controller 10, which integrally controls the above-mentioned structural elements in the accounting system. The call controller 10 is made up of an accounting controller 101, an information sending pattern controller 102, a call control processing unit 103, a resource controller 104, and an information storage unit selecting unit 105.

The information sending pattern controller 102 determines a timing and method necessary to send additional information provided by the additional information supplier to one or more subscribers. The operation of the information sending pattern controller 102 is based on information included in a call setup signal sent from a calling subscriber to a network (exchange), or information obtained by referring to the database unit 7. The information sending pattern controller 102 generates the following information sending patterns P1–P4 based on the above information referred to.

Pattern P1: This pattern indicates that additional information should be supplied to the calling subscriber until a connection signal (CONN) from the called subscriber is received after the calling subscriber calls the destination subscriber.

Pattern P2: This pattern indicates that additional information should be supplied to a subscriber which holds on.

Pattern P3: This pattern indicates that an additional information video should be supplied to a subscriber using a multimedia terminal until a communication is terminated after it is started in a case where the above subscriber requests only speech communications.

Pattern P4: This pattern indicates that an additional information video should be supplied to a subscriber using a multimedia terminal until a communication is terminated after it is started in a case where the multimedia information adding and distributing unit 3 is capable of superimposing additional information on a communications information video transferred between subscribers. For example, the additional information video is superimposed on a part of the communications information video.

The accounting controller 101 selects one of the patterns P1–P4 necessary for accounting, and performs an accounting process based on the selected pattern. In the accounting process based on the selected pattern, a variety of subscriber information (for example, indicating whether the subscriber terminal is an audio terminal or a multimedia terminal) can be saved in the database unit 7 as accounting parameters in order to determine the discount rate for communications between subscribers by referring to the discount table shown in FIG. 6. It is also possible to register the discount rate as additional information supplier information (provided for each supplier) serving as an accounting parameter used in the accounting process.

The information storage unit selecting unit 105 determines, by referring to the database unit 7, which information storage unit should be selected in order to supply additional information. More particularly, at the time of performing the above determining process, information concerning the additional information suppliers registered in the database unit 7 is referred to. Example of such information indicates the time zone in which it is requested that additional information be provided. The selected multimedia information adding and distributing unit 3 reads additional information from the selected information storage unit.

The resource controller 104 performs a process for reserving, setting (starting), stopping and releasing various resources. Examples of the resources are a communications path between subscribers, a path between a subscriber and the information storage unit selected by the information storage unit selecting unit 105, and the timer 5.

The call control processing unit 103 controls a call with respect to additional information accounting by performing a hardware control on the basis of signals communicating with subscribers and a signal transmitted from a subscriber. Further, the call controlling processor directly or indirectly controls the units 101–105, 12 and 15.

Figure 8:
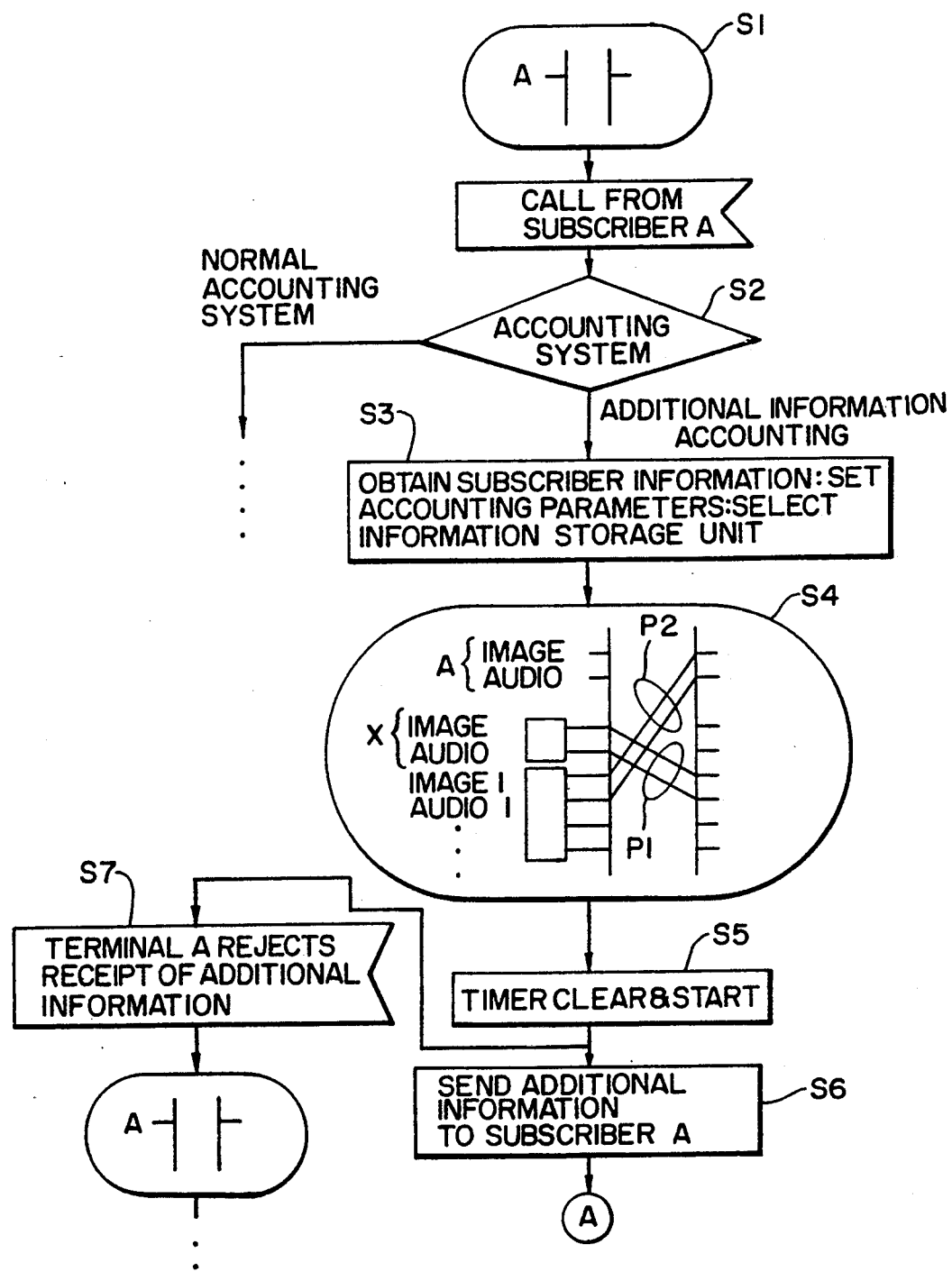
Figure 9:
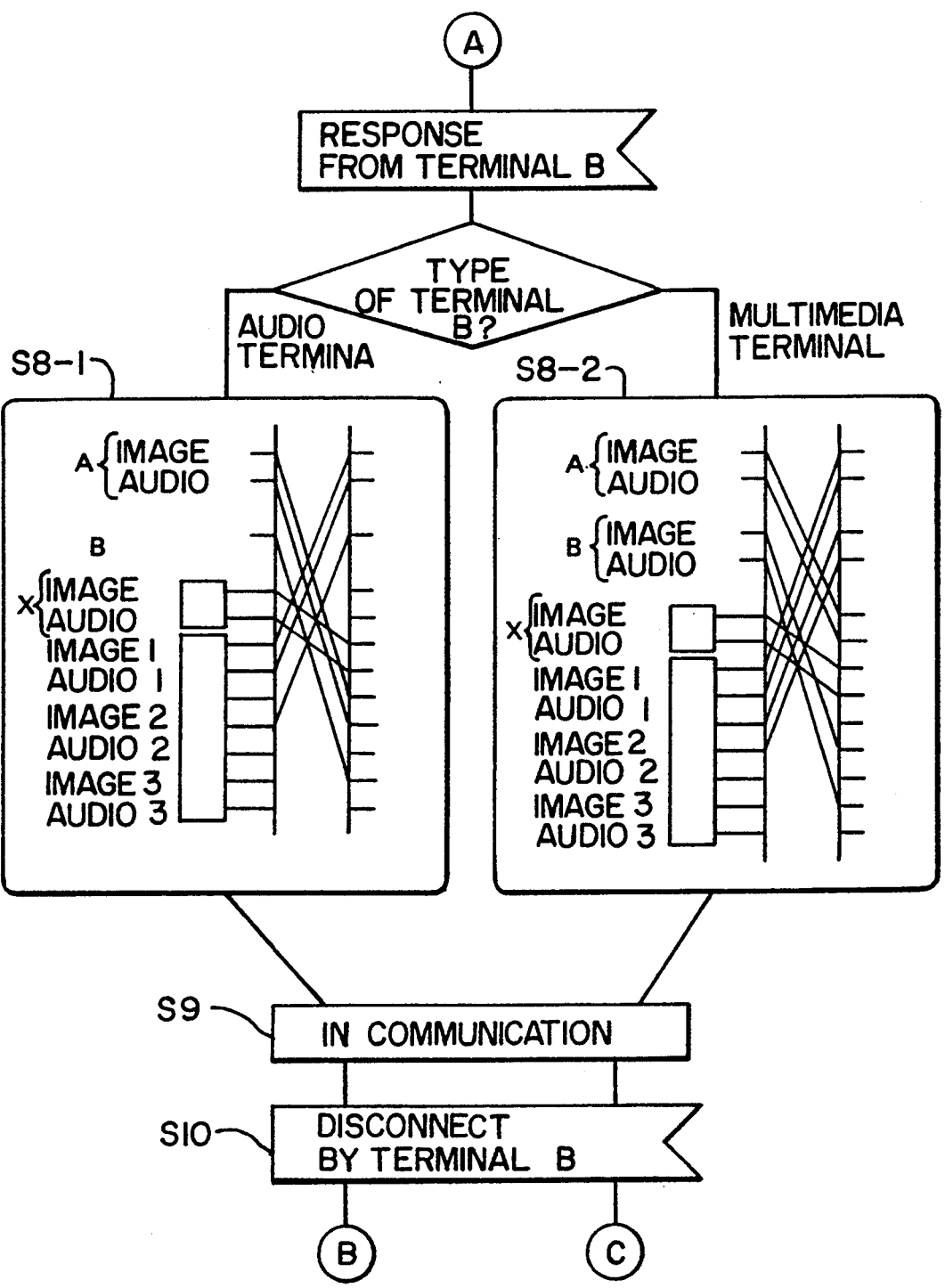
Figure 11:
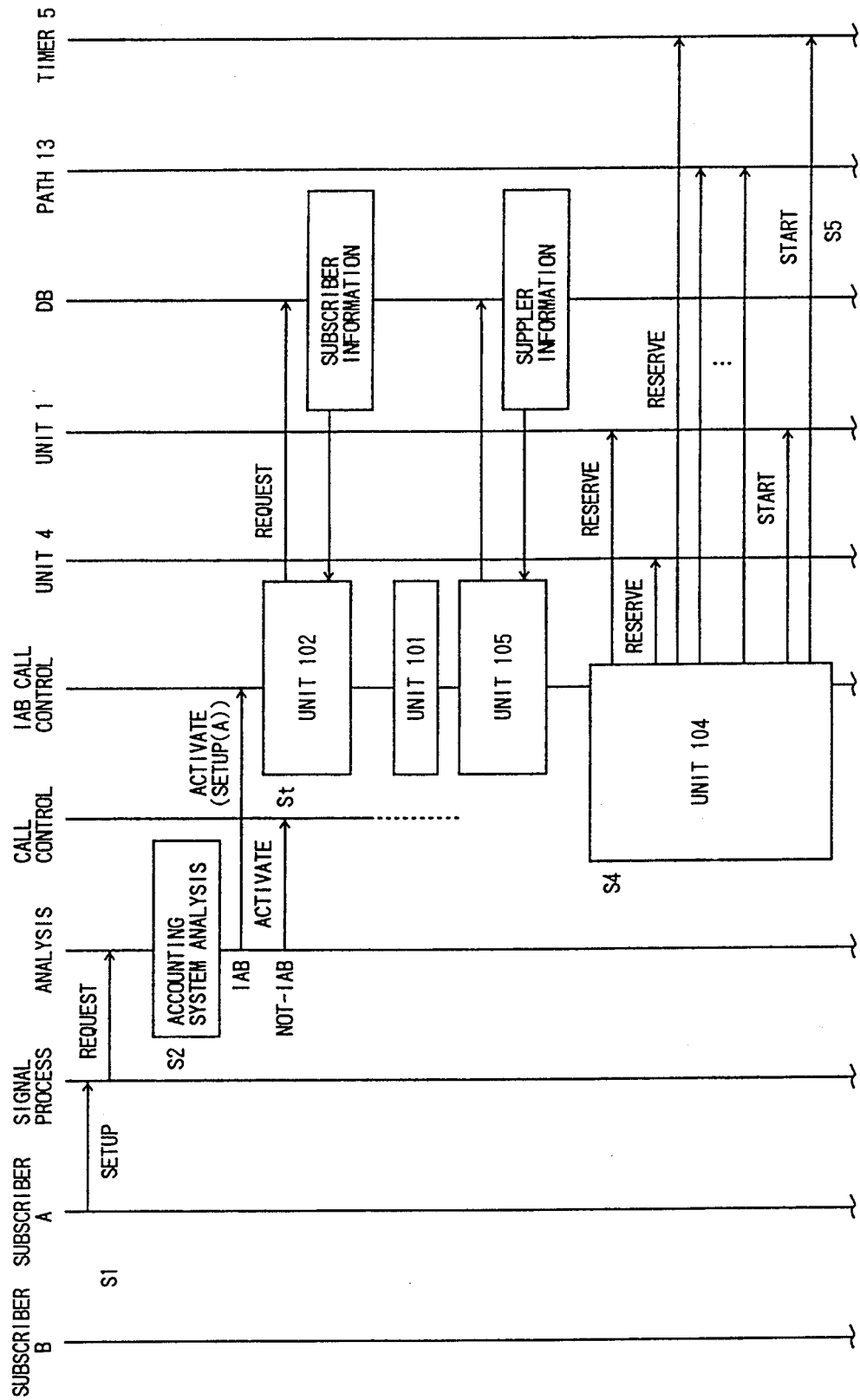
FIGS. 11 and 12 are sequence diagrams illustrating the operation of the first embodiment of the present invention.
Figure 12:
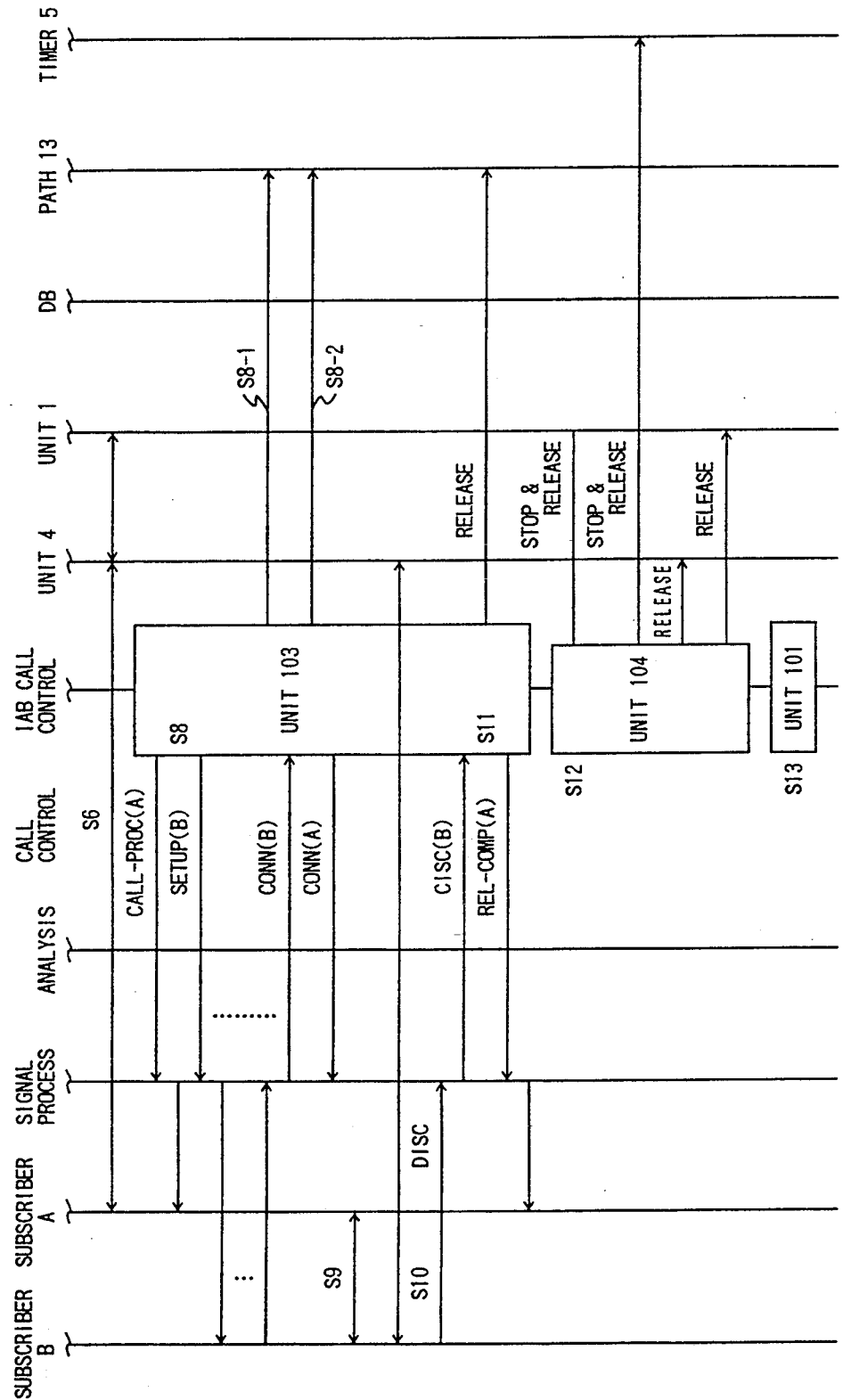
Figure 13:
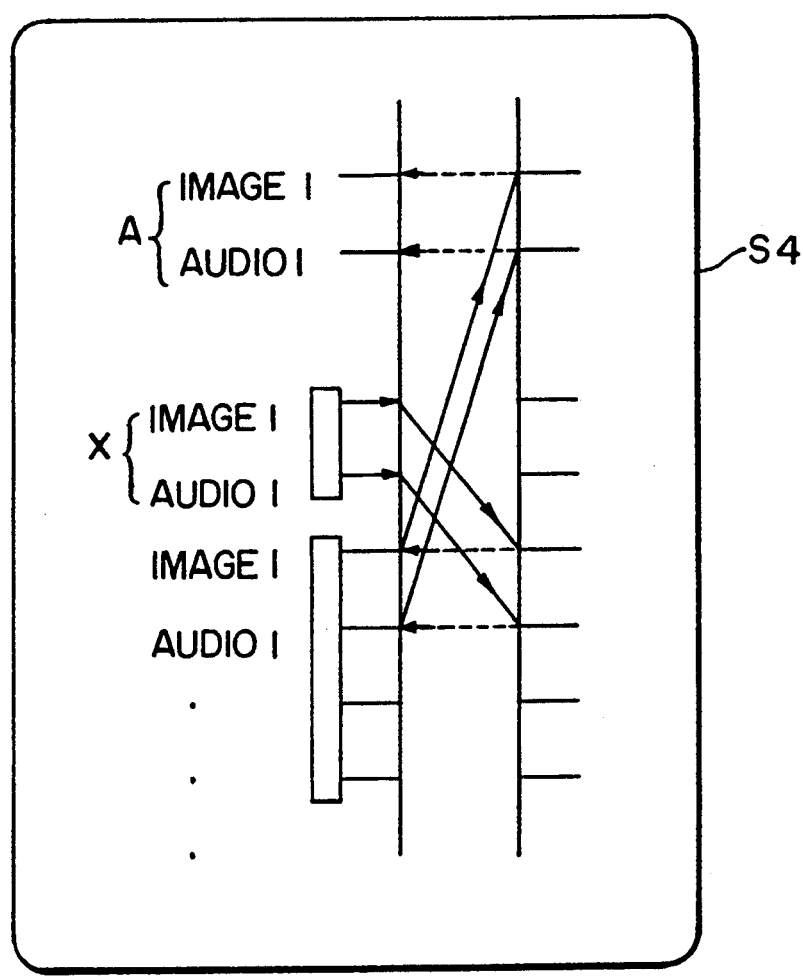
FIG. 13 is a diagram illustrating how paths are established.

A description will now be given of the operation of the accounting system according to the first embodiment of the present invention. FIGS. 8 through 10 are flowcharts of an accounting procedure applied to a communication between two subscribers, and FIGS. 11 and 12 are sequence diagrams of the above accounting procedure.

The following situations will now be assumed. First, the subscriber A uses a multimedia terminal. Second, the information sending patterns with respect to the subscribers A and B are registered in the information sending pattern designation column of the individual information table (FIG. 4) stored in the database unit 7, and are the pattern P1 or P3. The registration of the information sending pattern with respect to the subscriber B is valid only if the subscriber B uses a multimedia terminal. Third, the name X of the additional information supplier is registered in the individual information table, as shown in FIG. 4.

In step S1 shown in FIG. 8, the multimedia terminal of the subscriber A is in an idle state. An illustration in an oval circle indicated by S1 shows a network connection between the subscriber A and the accounting system including the exchange function shown in FIG. 2. In step S2, the analysis processing unit 15 analyzes information contained in a call setup signal from the subscriber A, and determines whether the normal accounting system or the additional information accounting system should be selected. When it is determined that the normal accounting system (this is indicated as NOT-IAB in FIGS. 11 and 12) should be selected, the analysis processing unit 15 activates the call controlling unit 16. When it is determined that the additional information accounting system (indicated as IAB) should be selected, the analysis processing unit 15 activates the additional information accounting call controller 10.

If the subscriber A rejects receipt of additional information during the call setup procedure or a communication by, for example, depressing a predetermined button, key or the like, the analysis processing unit 15 analyzes the above rejection, and activates the call controlling unit 16 instead of the additional information accounting call controller 10.

In step S3, the additional information accounting call controller 10 refers to the individual table (FIG. 4) stored in the database unit 7 via the database management system 9 and the I/O controller 8, and obtains information concerning the type of the terminal of the called subscriber B, the additional information supplier name (X is registered in the example shown in FIG. 4), and the information sending pattern. Further, the additional information accounting call controller 10 refers to the discount table (FIG. 6) and determines the accounting parameters and the information storage unit to be selected.

Figure 14:
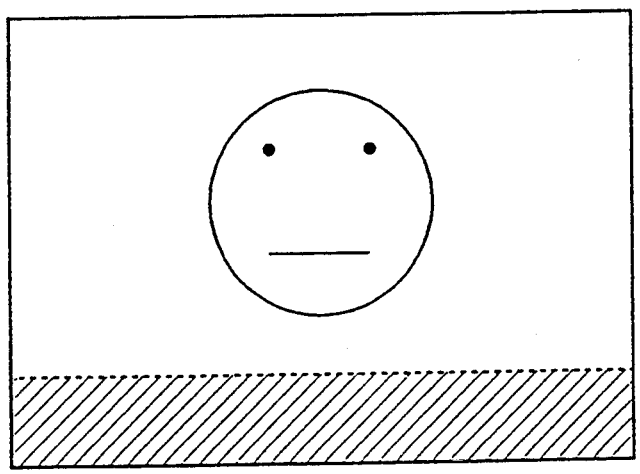
FIG. 14 is a diagram illustrating how additional video information supplied from an additional information supplier is displayed together with communication information transmitted between two subscriber terminals.

In step S4, the additional information accounting call controller 10 establishes a path P1 between the information storage unit 1 relating to the additional information supplier X registered by the subscriber X and the multimedia information adding and distributing unit 3, and a path P2 between the subscriber A and the multimedia information adding and distributing unit 3. FIG. 14 illustrates how video information and speech information supplied by the additional information supplier X are transferred to the subscriber A. In order to establish the above paths P1 and P2, the resources are reserved, as shown in FIG. 11.

In step S5, the call controller 10 clears the timer 5 via the timer controller 6 in order to start to measure the additional information receiving time.

In step S6, the additional information supplied from the supplier X is sent to the subscriber A. Hence, the subscriber A sees the additional information before a communication with the subscriber B is started.

When a signal specifying rejection of the additional information is received and analyzed by the analysis processing unit 15 shown in FIG. 2, the connection established in step S4 is released (step S7).

In step S8 shown in FIG. 9, a call control process is performed by the call control processing unit 103 shown in FIG. 3. As shown in FIG. 12, a call procedure signal CALL-PROC(A) is sent to the subscriber A via the corresponding signal processing unit 11, and a setup signal SETUP(B) is sent to the subscriber B via the corresponding signal processing unit 11. In response to the setup signal SETUP(B), the subscriber B sends a connection signal CONN(B) to the call control processing unit 103 via the analysis processing unit 15.

The analysis processing unit 15 shown in FIG. 2 analyzes the connection signal CONN(B) from the subscriber B, and identifies the type of the terminal of the subscriber B. When it is determined that the subscriber B uses an audio terminal such as a telephone set, in step S8-1 the subscriber B is not connected to the multimedia information adding and distributing units 3 since the terminal of the subscriber B cannot process video information.

When it is determined that the subscriber B uses a multimedia terminal, in step S8-2 the subscriber B is connected to the corresponding multimedia information adding and distributing unit 3 under the control of the resource controller 104 shown in FIG. 3 since the terminal of the subscriber B can process video information. The information sending pattern controller 102 shown in FIG. 3 refers to the individual information table shown in FIG. 4, and identifies the information sending pattern registered with respect to the subscriber B. When the pattern P3 is registered with respect to the subscribers A and B, the additional information supplied by the supplier X is displayed on screens of the terminals of the subscribers A and B.

The call control processing unit 103 sends a connection signal CONN(A) to the analysis processing unit 15. In the state in which the additional information is displayed on the screens of the terminals of the subscribers A and B, speech information can be transferred between the subscribers A and B in step S9.

If the information sending pattern P4 is registered with respect to the subscribers A and B, the additional information supplied by the supplier X can be displayed on parts of the screens of the terminals of the subscribers A and B, as shown in FIG. 14.

When the communication between the subscribers A and B is completed, the subscriber B sends a disconnect signal DISC to the analysis processing unit 15 in step S10. Then, the analysis processing unit 15 sends a disconnect signal DISC(B) to the call control processing unit 103. In response to the disconnect signal DISC(B), the path is released, and a release complete signal REL-COMP(A) indicating the end of communication is sent to the subscriber A via the analysis processing unit 15 in step S11.

In step S12, the resource controller 104 stops and releases the information storage unit 1, the timer 5, and the multimedia information adding/distributing unit 3. The resource controller 104 writes time information indicating the time during which the additional information is supplied with the subscriber A into the individual information table shown in FIG. 4. Hence, the accumulated receiving time relating to the subscriber A is updated.

In step S13, the accounting controller 101 calculates a fee for the subscriber A. For example, step S13 can be periodically performed, for example, every month. In step S13, the fee obtained by referring to the normal accounting table (FIG. 5) is multiplied by a value [100—(discount rate)]/100. The discount rate is obtained by referring to the discount table shown in FIG. 6 on the basis of the accumulated receiving time registered in the individual information table shown in FIG. 4. The result of the above multiplication is the fee to be charged to the subscriber A. The charge thus calculated is registered in the database unit 7 in step S14. The discount portion of the fee is charged to the additional information supplier.

Figure 15:
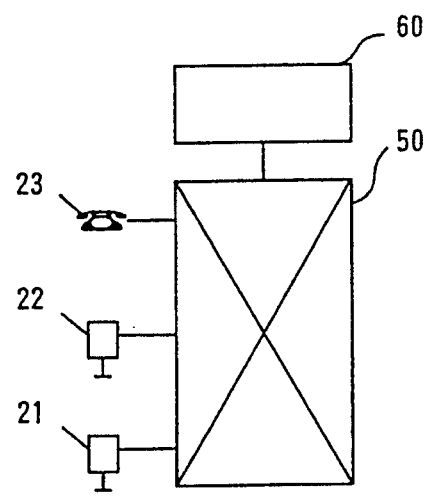
FIG. 15 is a diagram illustrating an overview of the overall network structure of the first embodiment of the present invention.

FIG. 15 shows a communications system including the accounting system according to the first embodiment of the present invention. A network 50 corresponds to the signal processing units 11, the subscriber communications control unit 12, a communication path network 13, a communication path network control unit 14, the analysis processing unit 15 and the call controlling unit 16 shown in FIG. 2. A block 60 denotes the additional information accounting system which comprises the information storage units 1, the information storage unit controller 2, the multimedia information adding and distributing units 3, the multimedia information adding and distributing controller 4, the timer 5, the timer controller 6, the database unit 7, the I/O controller 8, the database management system 9, and the additional information accounting call controller 10 shown in FIG. 2.

A description will now be given of an accounting system according to a second embodiment of the present invention.

Figure 16:
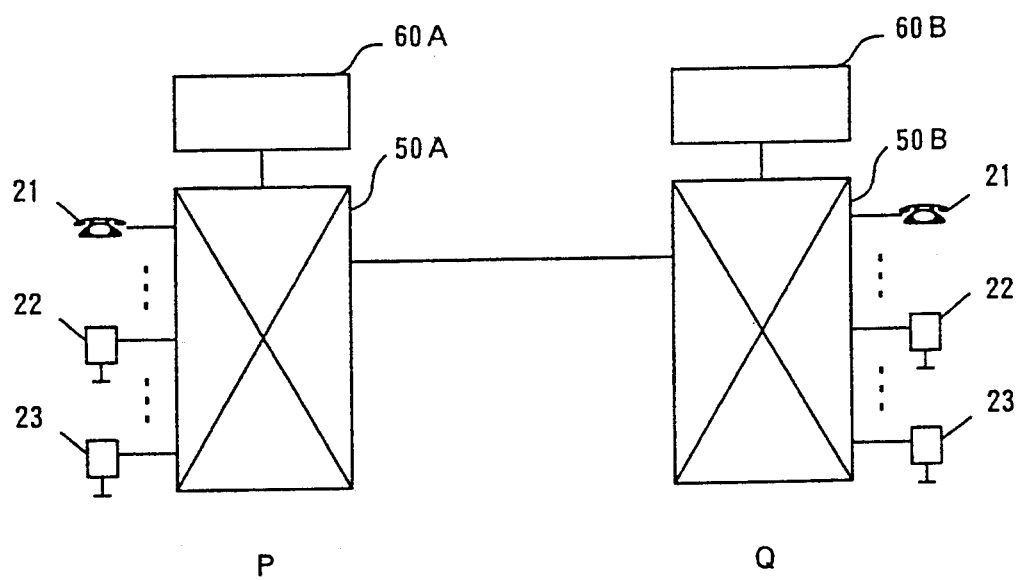
FIG. 16 is a diagram illustrating an overview of the overall network structure of a second embodiment of the present invention.

FIG. 16 is a block diagram of a communications system including the accounting system according to the second embodiment of the present invention. The communications system includes networks 50A and 50B, and additional information accounting systems 60A and 60B. Each of the networks 50A and 50B is the same as the network 50, and each of the additional information accounting systems 60A and 60B is the same as the additional information accounting system 60. It will be noted that a plurality of additional information accounting systems 60A and 60B are provided in the communications system.

Figure 17:
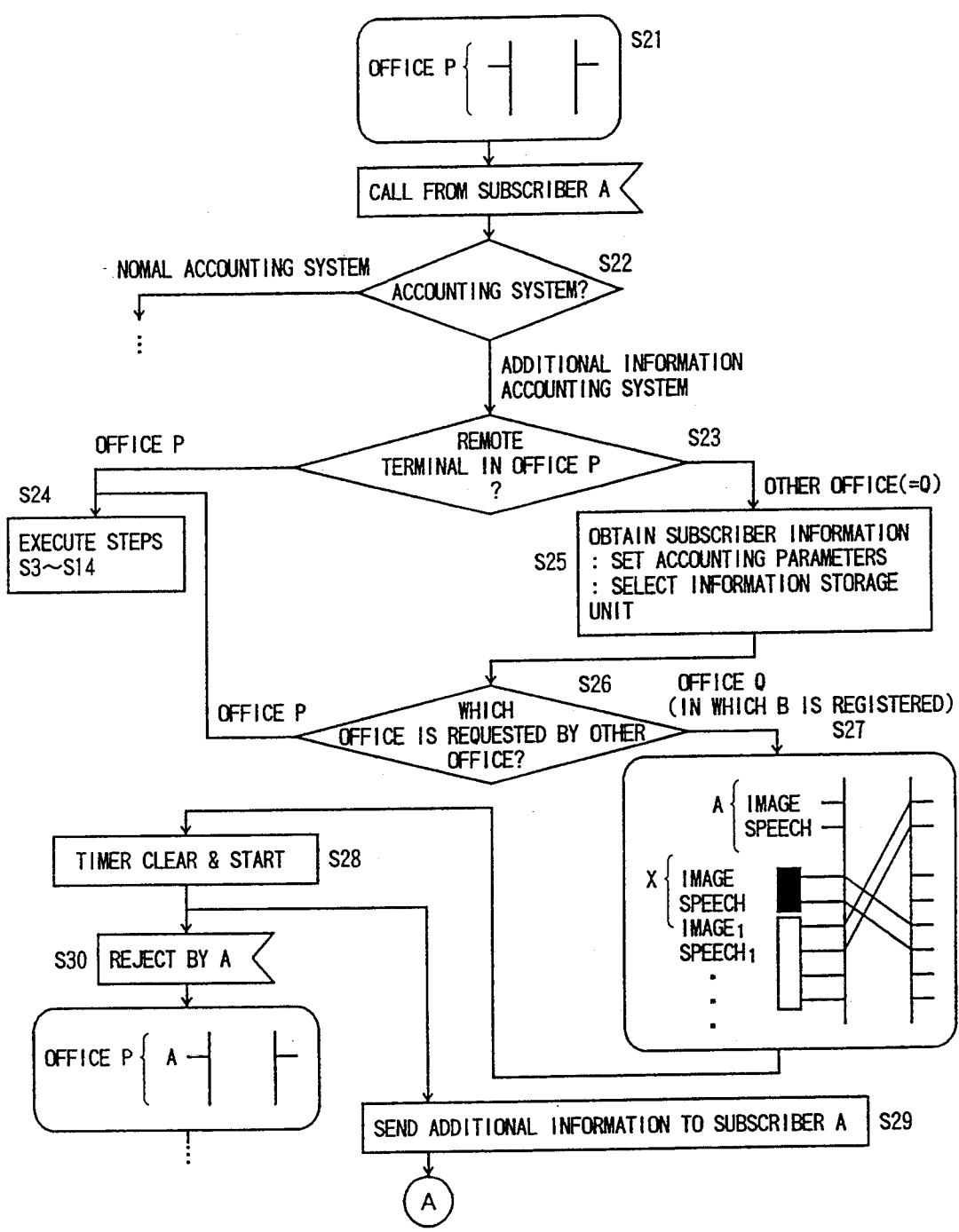
FIGS. 17, 18 and 19 are flowcharts of the operation of the second embodiment of the present invention.
Figure 18:
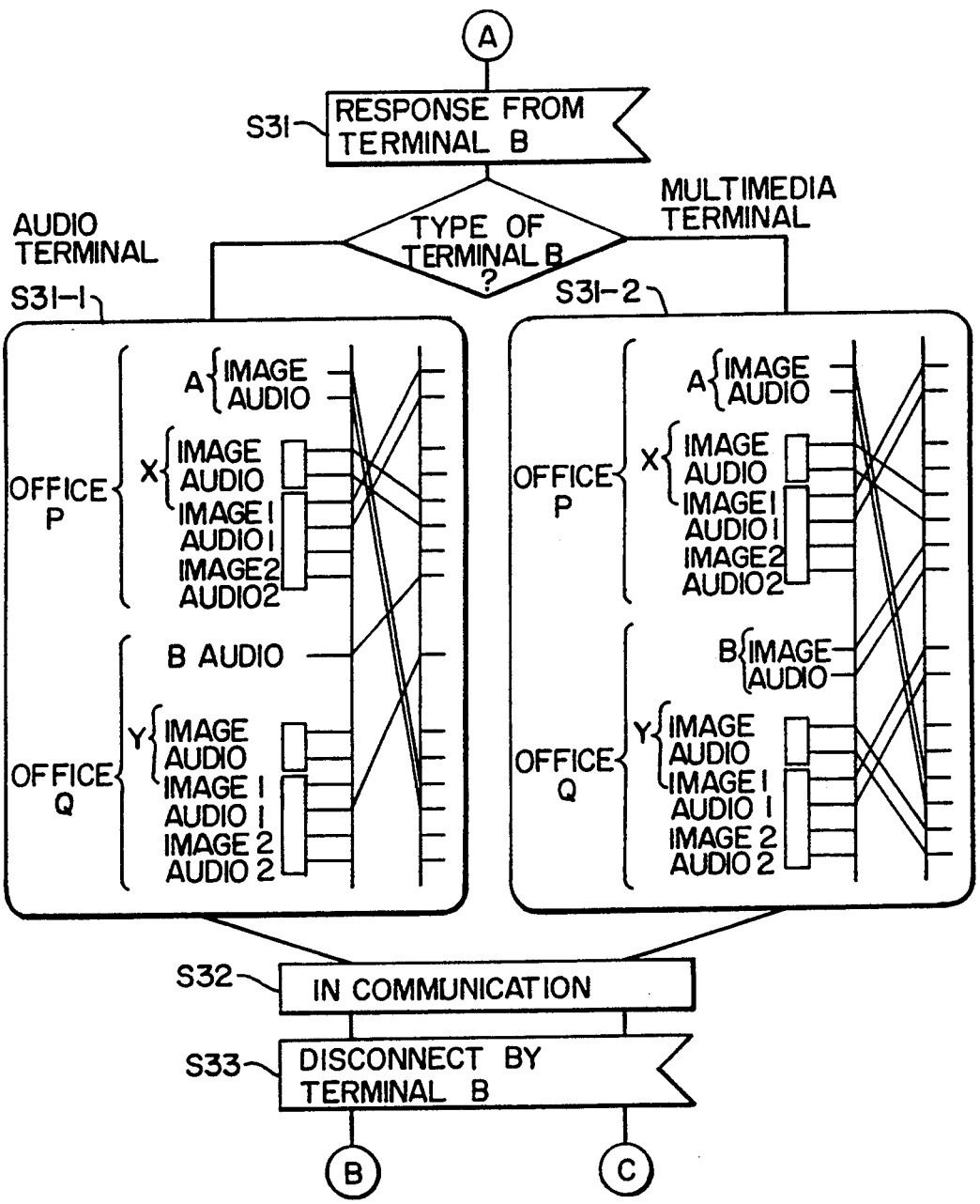
Figure 19:
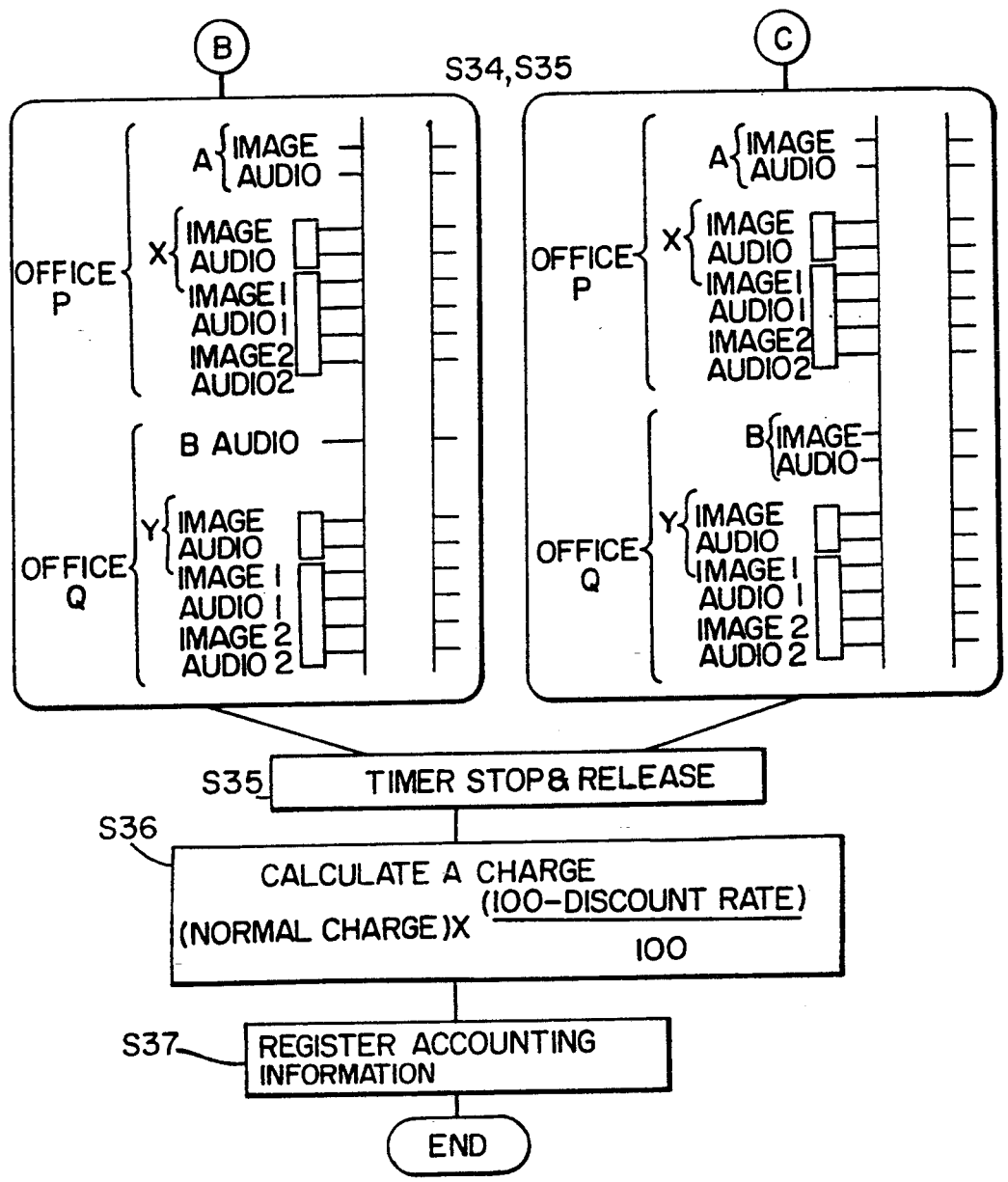
Figure 20:
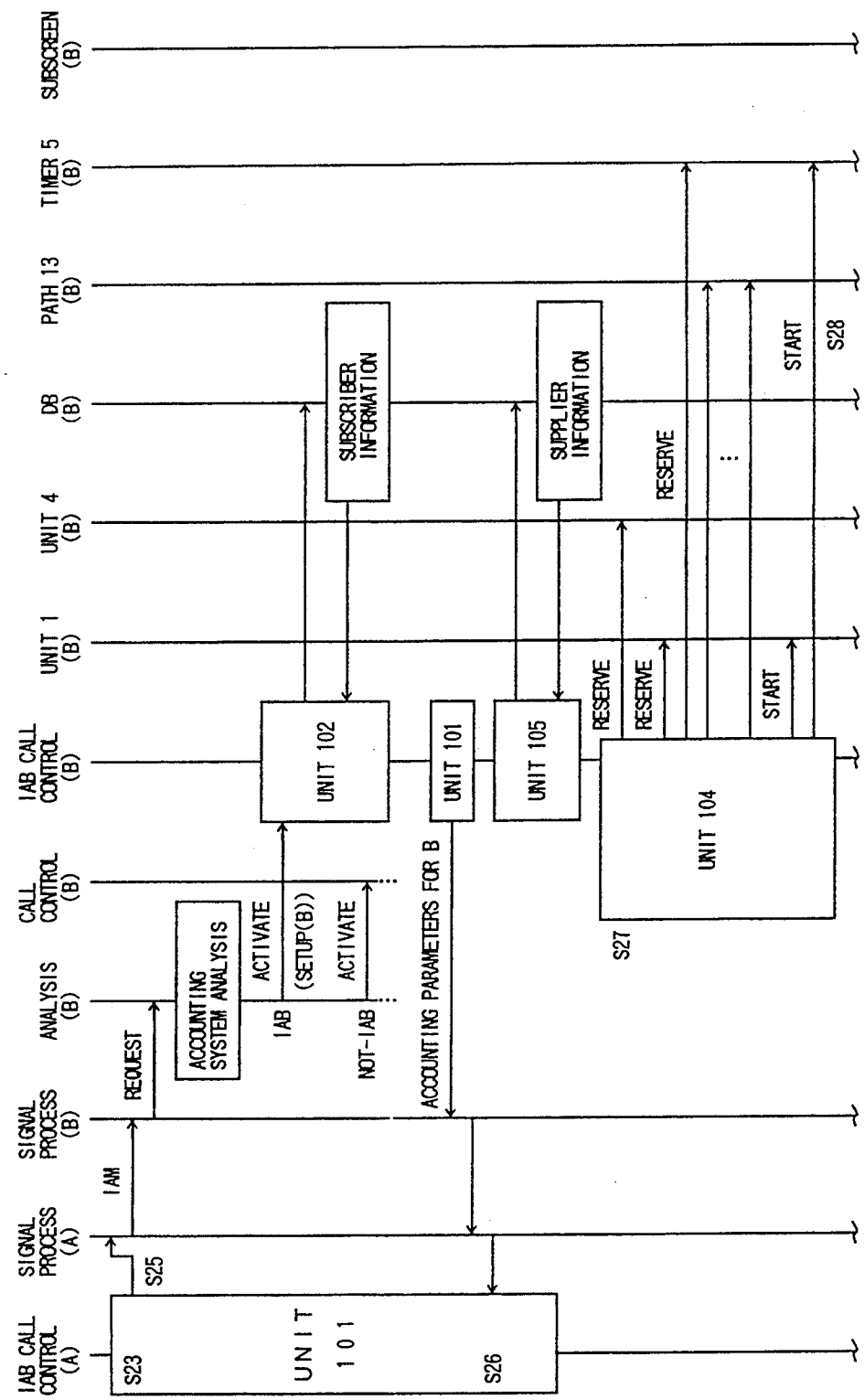
FIGS. 20 and 21 are sequence diagrams illustrating the operation of the second embodiment of the present invention.
Figure 21:
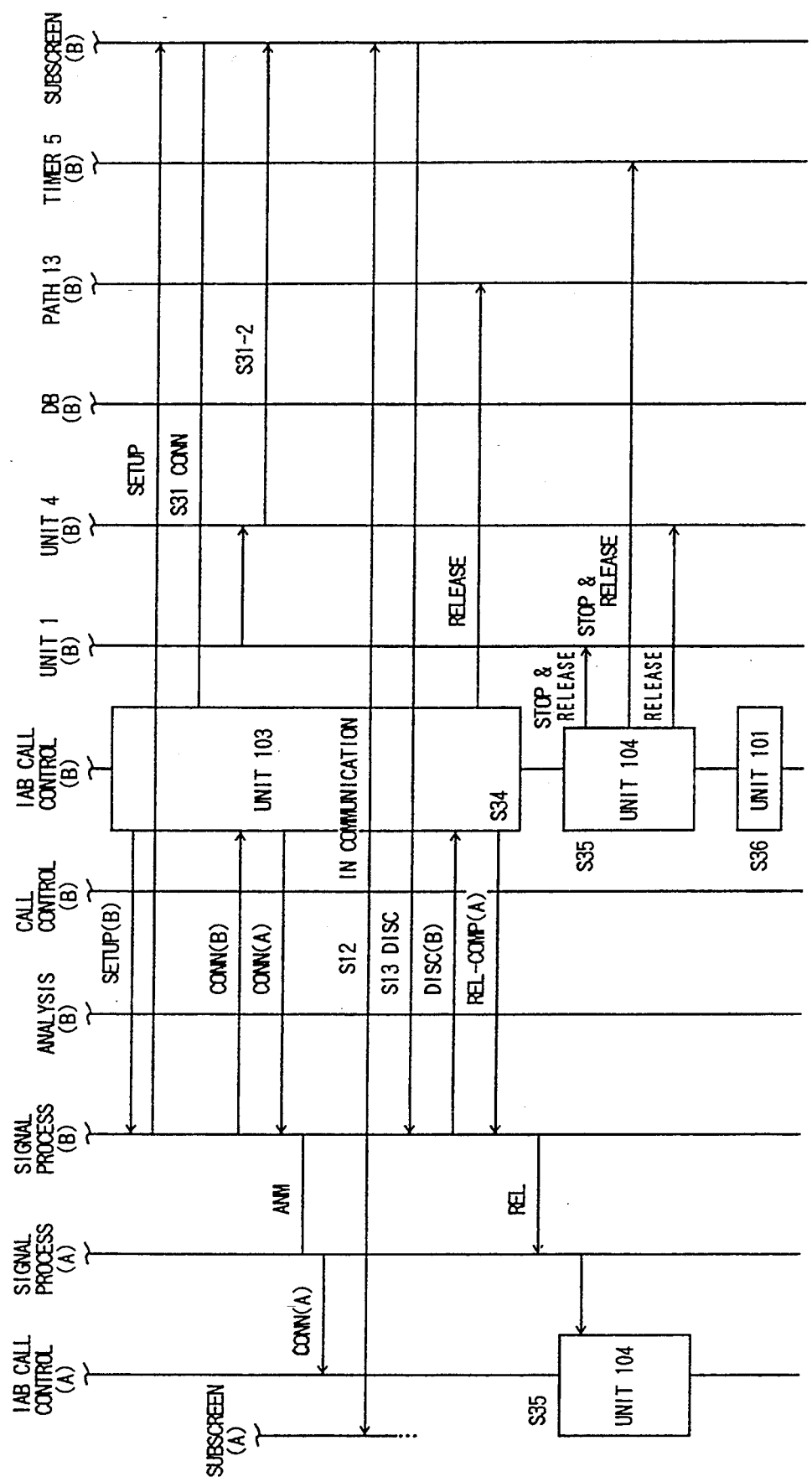

A description will now be given, with reference to FIGS. 17 through 21, of the operation of the second embodiment of the present invention. FIGS. 17 through 19 are flowcharts of an accounting control procedure applied to a communication between two subscribers accommodated in respective (different) networks (exchange offices), and FIGS. 20 and 21 are sequence diagrams of the above accounting procedure.

It will now be assumed that the networks 50A and 50B are respectively provided in exchange offices P and Q and that the subscriber A is a multimedia terminal and is accommodated in the network 50A.

In step S21 shown in FIG. 17, the multimedia terminal of the subscriber A is in an idle state. In step S22, the analysis processing unit 15 in the network 50A in the exchange offices P analyzes information contained in a call setup signal from the subscriber A, and determines whether the normal accounting system or the additional information accounting system should be selected. When it is determined that the normal accounting system should be selected, the analysis processing unit 15 activates the call control unit 16. When it is determined that the additional information accounting system should be selected, the analysis processing unit 15 activates the call control processing unit 103 in the exchange office P. Then the unit 103 determines, in step S23, whether or not information concerning the called subscriber B is registered in the same database as information concerning the calling subscriber A. In other words, it is determined whether or not information concerning the called subscriber B is registered in the additional information accounting system 60A in the exchange office P.

When the result of step S23 is affirmative, step 24 corresponding to the steps S3–S14 shown in FIGS. 8 through 10 is executed. When it is determined, in step S22, that the called subscriber B is registered in the additional information accounting system 60B in the exchange office Q, in step S25 the call control processing unit 103 in the network 50A sends a request signal IAM (FIG. 20) to the analysis processing unit 15 in the network 50B in the exchange office Q under the control of the subscriber communications control unit 12. The request signal IAM requests to transfer information concerning the subscriber B from the exchange office Q to the exchange office P.

In response to the request signal IAM, the analysis processing unit 15 in the network 50B determines whether the normal accounting system or the additional information accounting system should be selected. When it is determined that the normal accounting system should be selected, the analysis processing unit 15 in the network 50B activates the call controller 16 in the network 50B. When it is determined that the additional accounting system should be selected, the analysis processing unit 15 in the network 50B activates the additional information accounting call controller 10 by sending the setup signal SETUP(B) to the call control processing unit 103.

The information sending pattern controller 102 shown in FIG. 3 receives the setup signal SETUP(B) via the call control processing unit 103, and accesses the database unit 7 via the database management system 9. The information sending pattern controller 102 obtains the individual information concerning the subscriber B including the pattern information. The individual information is then sent to the accounting controller 101, which determines the accounting parameters to be used. Then, the accounting controller 101 in the additional information accounting system 60B sends information concerning the accounting parameters to the call control processing unit 103 in the additional information accounting system 60A.

In step S26 shown in FIG. 17, the call control processing unit 103 in the exchange office P refers to the received information concerning the subscriber B, and identifies the exchange office from which the subscriber B requests to receive additional information. Information to be used for the above identification is registered in the individual information table shown in FIG. 4. In FIG. 4, the subscriber B requests to receive additional information from an exchange office which receives a call sent by another exchange office. When the called subscriber B requests to receive additional information stored in the exchange office P in which the calling subscriber A is also accommodated, step S24 is performed. When the called subscriber B requests to receive additional information stored in the exchange office Q, step S27 shown in FIG. 17 is performed.

Before step S27 is performed, the information storage unit selecting unit 105 shown in FIG. 3 accesses the database unit 7 and obtains information concerning the additional information supplier with respect to the subscriber B. Thereafter, steps S27–S31 are sequentially performed in the same manner as the steps S7–S11 shown in FIGS. 8 and 9.

When it is determined, in step S31, that the subscriber B uses an audio terminal, the call control processing unit 103 in the additional information accounting system 60B establishes paths shown in FIG. 18 in step S31-1. In FIG. 18, A denotes a subscriber accommodated in the exchange office P, and X is an additional information supplier accommodated in the exchange office P. Further, B denotes a subscriber accommodated in the exchange office Q, and Y is an additional information supplier accommodated in the exchange office Q. As shown in FIG. 18, additional information supplied by the supplier X is sent to the subscriber A, whereas additional information supplied by the supplier Y is not sent to the subscriber B.

When it is determined, in step S31, that the subscriber B uses a multimedia terminal, paths shown in FIG. 18 in step S31-2 are established. In this case, additional video and speed information supplied by the supplier X is sent to the subscriber A, and additional video and speech information supplied by the supplier Y is sent to the subscriber B.

The terminal A becomes connected to the terminal B in response to a connection signal CONN(A) output by the call control processing unit 103 of the call controller 10. The connection signal CONN(A) is output to the corresponding signal processing unit 11 in the network 50B, and the unit 11 sends an answer message signal ANM to the signal processing unit 11 in the network 50A. In response to the answer message signal ANM, the signal processing unit 11 sends the connection signal CONN(A) to the call controller 10 in the network 50A.

Then, the subscribers A and B communicate with each other in step S32. During the communication, the subscriber B is supplied with the additional information supplied from the information storage unit 1 registered by the subscriber B.

When the subscriber B terminates the communication in step S33, the call control processing unit 103 sends the disconnect signal DISC to the signal processing unit 11 in the network 50B via the subscriber communications control unit 12. In response to the disconnect signal DISC, the signal processing unit 11 in the network 50B sends back the disconnect signal DISC(B) to the call control processing unit 103 in the additional information accounting system 60B. In step S34, the call control processing unit 103 in the system 60B sends the release complete signal REL-COMP(A) to the signal processing unit 11 in the network 50B. Then, the signal processing unit 11 in the network 50B sends the release signal REL to the signal processing unit 11 in the network 50A. The signal processing unit 11 in the network 50A instructs the call controller 10 to release the resources and the paths in step S35.

Further, in step S35, the call controller 10 in the system 60B releases the resources and the paths. Then, steps S36 and 37 are performed in the same manner as the steps S13 and S14. Normally, the calling subscriber A is charged. It is also possible to charge the payment calculated in step S36 to the subscriber B or to both the subscribers A and B.

According to the second embodiment of the present invention, the additional information accounting call controlling systems are decentralized in the multimedia communications system. Hence it is possible to prevent a load from concentrating on a node in the multimedia communications system. Further, additional information unique to local areas can be efficiently provided. If there is a long distance between the calling terminal and the called terminal, the called terminal may be not be interested in additional information supplied from a supplier accommodated in the network to which the calling terminal is connected. In this case, the called terminal will be more interested in additional information supplied from a supplier accommodated in the network to which the called terminal is also connected.

A description will now be given of a third embodiment of the present invention. In the first and second embodiments of the present invention, information concerning the additional information suppliers is registered in the database unit or units 7. According to the third embodiment of the present invention, such information concerning the additional information suppliers can be displayed on a display unit of each multimedia terminal. The information displayed includes the additional information suppliers, the contents of pieces of additional information, the discount rates and the like. The subscriber can select additional information which the subscriber wishes to receive by means of a keyboard or the like. The accounting system receives information selected by the operator and analyzes the received information.

Further, display of additional information can be controlled by the subscriber. For example, the subscriber can stop displaying additional information and restart display. Further, it is possible for the subscriber to specify the size of a display of additional information to be superimposed on the entire screen. For example, items indicating various display sizes are indicated on the display, and the subscriber selects a desired one of the display sizes.

The display size can be used as an accounting parameter. The additional information supplier is billed on the basis of the display size selected by the subscriber.

FIG. 22 shows a discount table defining the discount rate dependent on the display size. According to the discount table shown in FIG. 22, the discount rate is 100% when additional information is displayed on the entire screen, and is 50% when additional information is displayed on half of the screen. It will be noted that the charge is not zero even when the discount rate is 100%. The discount rate based on the display size can be used as follows:

$$(\text{discounted cost}) \times (100 - R)/100$$

where R is the discount rate based on the display size. The discounted cost is the cost after a reduction based on the discount rate defined in the discount table shown in FIG. 6.

It is possible to provide the display size based discount tables for the respective additional information suppliers.

The following first, second and third accounting procedures based on the display size can be used. The first accounting procedure uses timers provided for the respective display sizes. The timers measure how long additional information is displayed with the respective display sizes. The fee is based on the time intervals measured by the timers. The second accounting procedure uses a single timer provided for the minimum display size. The charge is based on the time measured by the timer. The third accounting procedure uses a single timer provided for the maximum display size. The charge is based on the time intervals measured by the timer.

Figure 23:
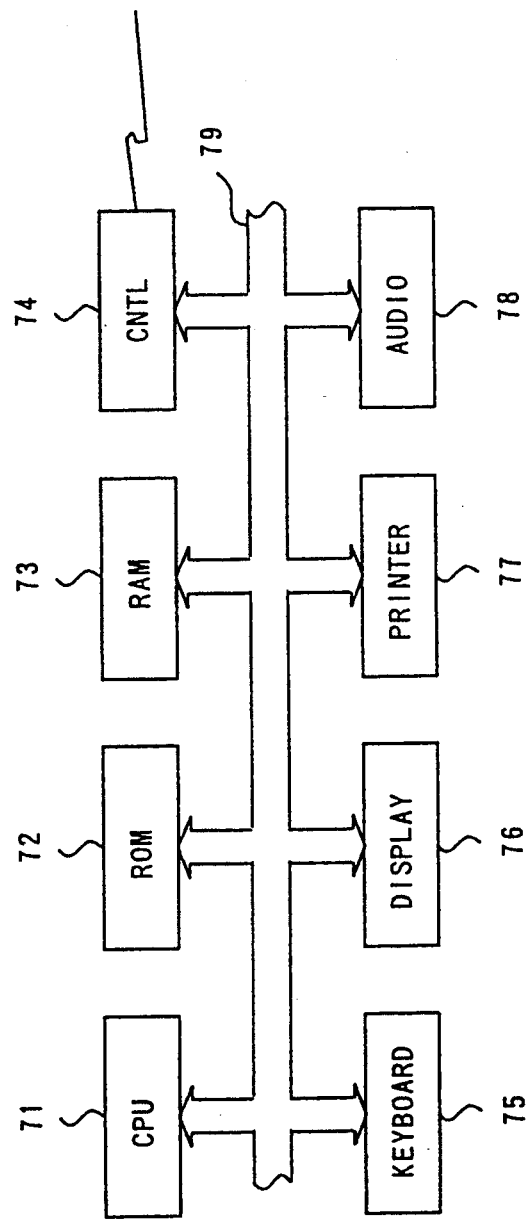
FIG. 23 is a block diagram of a multimedia terminal used in the embodiments of the present invention.

FIG. 23 is a block diagram of a multimedia terminal. The multimedia terminal is made up of a CPU (Central Processing Unit) 71, a ROM (Read Only Memory) 72, a RAM (Random Access Memory) 73, a communications controller (CNTL) 74 including a modem, a keyboard 75, a display unit 76, a printer 77 and an audio unit 78. These structural elements 71–78 are connected to each other via a bus 79. The printer 77 may be omitted. The audio unit 78 includes a speaker and outputs an acoustic signal to the subscriber.

The hardware structure of the accounting system used in the third embodiment of the present invention is almost the same as that used in the first and second embodiments thereof.

Figure 24:
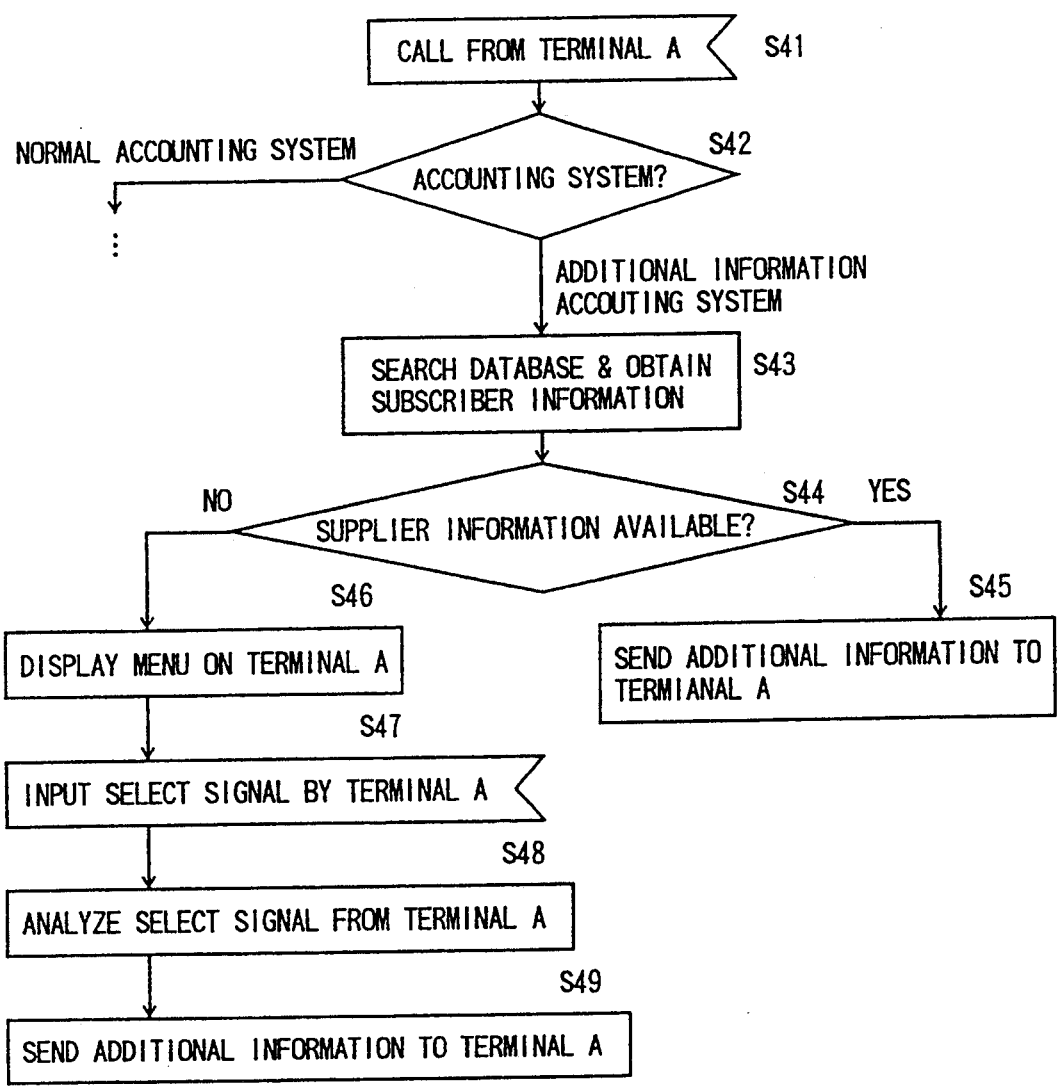
FIGS. 24 and 25 are flowcharts of the operation of the third embodiment of the present invention.
Figure 25:
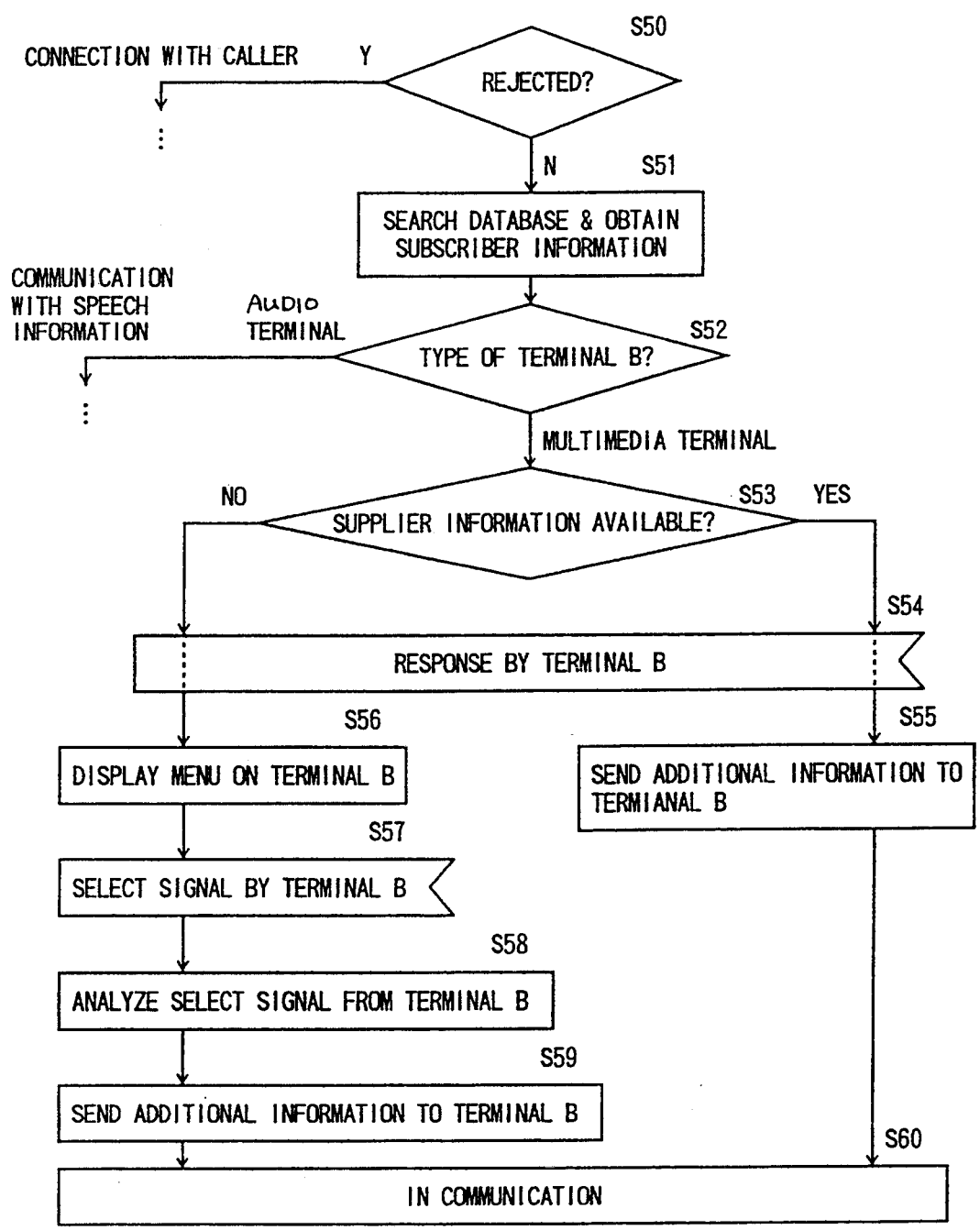

A description will now be given, with reference to FIGS. 24 and 25, of the operation of the third embodiment of the present invention.

In step S41, the subscriber A outputs a call setup signal to the analysis processing unit 15. In step S42, the analysis processing unit 15 refers to the call setup signal, and determines whether the normal accounting system or the additional information accounting system should be selected. When it is determined, in step S42, that the additional accounting system should be selected, the analysis processing unit 15 informs the call controller 10 of the selection of the additional information accounting system. The call controller 10 accesses the database unit 7, and determines whether or not information concerning the additional information supplier registered with respect to the calling subscriber A has been registered. When the result of the above determination is YES, additional information from the additional information supplier is sent to the subscriber A in the aforementioned manner according to the information specified in the database unit 7 in step S45.

When the result of the step S44 determination is NO, the call controller 10 sends the subscriber A a response signal indicating that there is no additional information supplier with respect to the subscriber A. The above response signal is received by the CPU 71 via the communications controller 74. The CPU 71 starts a menu program stored in, for example, the ROM 72, and causes an additional information supplier selecting menu to be displayed on the display unit 76 in step S46. The subscriber A specifies various parameters concerning desired additional information by means of the keyboard 75 in step S47. Data corresponding to the specified parameters is sent to the analysis processing unit 15 shown in FIG. 2 via the communications controller 74.

The analysis processing unit 15 analyzes the received data in step S48. In step S49, desired additional information is sent to the subscriber A. In step S49, steps the same as the steps S4-S6 shown in FIG. 8 are carried out. If the subscriber A wishes to reject the additional information, the subscriber A operates a predetermined key on the keyboard 75. A rejection signal is sent to the analysis processing unit 15.

In step S50, the analysis processing unit 15 determines whether or not the subscriber A rejects the additional information by discerning whether or not the rejection signal from the subscriber A has been received. When it is determined that the subscriber A rejects the additional information, the subscriber A is connected to the subscriber B under the control of the call controlling unit 16. When it is determined that the subscriber A accepts the additional information, the call controller 10 accesses the database unit 7, and obtains information concerning the subscriber B in step S51.

In step S52, the call controller 10 refers to the information obtained in step S51, and identifies the type of the terminal corresponding to the subscriber B. When it is determined that the subscriber B uses an audio terminal, the same step as step S8-1 is carried out. When it is determined that the subscriber B uses a multimedia terminal in step S53, the call controller 10 refers to the information obtained in step S51 and determines whether or not information concerning additional information suppliers with respect to the subscriber B has been registered.

When the result of step S53 is YES, in step S55 additional information based on information on specified in the database unit 7 is sent to the subscriber B after the subscriber B responds to the call from the subscriber A. When the result of step S53 is NO, in step S56 the call controller 10 sends a menu request signal to the subscriber B. In response to receipt of the menu request signal, the CPU 71 of the multimedia terminal of the subscriber B starts a menu program stored in, for example, the ROM 72, and causes an additional information supplier selecting menu to be displayed on the display unit 76 in step S56. The subscriber B specifies various parameters concerning desired additional information by means of the keyboard 75 in step S57. Data corresponding to the specified parameters is sent to the analysis processing unit 15 shown in FIG. 2 via the communications controller 74.

The analysis processing unit 15 analyzes the received data in step S58. In step S59, desired additional information is sent to the subscriber B. In step S59, steps the same as the steps S4-S6 shown in FIG. 2 are performed.

The present invention is not limited to the specifically disclosed embodiments, and variations and modifications may be made without departing from the scope of the present invention.

What is claimed is:

1. An accounting system for a multimedia communications system comprising:
    additional information storage means for storing advertising image information to be supplied to subscriber terminals in the multimedia communications system by one or a plurality of additional information suppliers;
    additional information adding means provided in an exchange system of the multimedia communications system, for adding at least the advertising image information to communication image information transmitted between subscriber terminals communicating with each other;
    measurement means for measuring a degree of supply of the advertising image information supplied to at least one of the subscriber terminals communicating with each other;
    database means for storing accounting information used to calculate a fee for a communication between the subscriber terminals communicating with each other; and
    control means for calculating the fee for said communication between the subscriber terminals communicating with each other on the basis of the accounting information and the degree of supply of the advertising image information measured by the measurement means.

2. The accounting system as claimed in claim 1, wherein:
    said database means stores, as the accounting information, discount rate information indicating a discount rate depending on the degree of supply of the advertising image information, and normal fee information indicating a normal fee to be used when no advertising image information is supplied to the subscriber terminals communicating with each other; and
    the control means comprises means for reducing the normal fee in accordance with the discount rate based on the degree of supply of the advertising image information measured by said measurement means.

3. The accounting system as claimed in claim 1, wherein:
    said database means stores, as the accounting information, supplier information indicating at least one supplier of advertising image information to be selected on the basis of which subscriber terminals communicate with each other; and
    said control means comprises selecting means for selecting at least one supplier of said advertising image information on the basis of the subscriber terminals communicating with each other.

4. The accounting system as claimed in claim 3, wherein:
    said database means stores, as the accounting information, other supplier information indicating at least one supplier of advertising image information to be selected; and
    said selecting means of said control means selects at least one supplier of said advertising image information supplier on the basis of the subscriber terminals communicating with each other as well as said other supplier information.

5. The accounting system as claimed in claim 1, wherein said measurement means comprises time measuring means for measuring a time interval during which the advertising image information is supplied to at least one of the subscriber terminals communicating with each other.

6. The accounting system as claimed in claim 1, wherein said measurement means comprises amount-of-advertising image-information measuring means for measuring an amount of the advertising images information supplied to at least one of the subscriber terminals communicating with each other.

7. The accounting system as claimed in claim 1, wherein:
the accounting system further comprises rejecting means, provided in each of the subscriber terminals, for sending a rejection signal to said control means;
the rejection signal denotes rejection of the advertising image information; and
said control means comprises means for preventing said additional information adding means from adding the advertising image information to the communication image information in response to the rejection signal.

8. The accounting system as claimed in claim 1, wherein said control means comprises means for causing said additional information adding means to supply the advertising image information to at least one of the subscriber terminals before the communication between said subscriber terminals starts.

9. The accounting system as claimed in claim 1, wherein said control means comprises means for causing said additional information adding means to continuously supply the advertising image information to at least one of the subscriber terminals during the communication between said subscriber terminals.

10. The accounting system as claimed in claim 1, wherein said advertising image information comprises video information and speech information.

11. The accounting system as claimed in claim 10, wherein the subscriber terminals comprise multimedia terminals capable of handling video information and speech information.

12. The accounting system as claimed in claim 11, wherein each of the multimedia terminals comprises display means for displaying the video information contained in the advertising image information.

13. The accounting system as claimed in claim 12, wherein each of the multimedia terminals comprises means for causing the display means to display the video information contained in the advertising image information in a part of an entire screen area of said display means.

14. The accounting system as claimed in claim 13, wherein:
said database means stores, as the accounting information, discount rate information indicating a discount rate based on a size of said part of the entire screen area of said display means, and normal fee information indicating a normal fee to be used when no advertising image information is supplied to the subscriber terminals communicating with each other; and
the control means comprises means for reducing the normal fee in accordance with the discount rate based on the size of said part of the entire screen area of said display means.

15. The accounting system as claimed in claim 1, further comprising input means, provided for each of the subscriber terminals, for providing said control means with supplier information indicating at least one supplier of advertising image information from which each of the subscriber terminals requests to receive the advertising image information; and
said control means comprises selecting means for selecting at least one supplier of advertising image information on the basis of the supplier information provided by said input means.

16. The accounting system as claimed in claim 1, wherein said additional information storage means comprises a plurality of storage units provided in said multimedia communications system so that the advertising image information is decentralized in the multimedia communications system.

17. The accounting system as claimed in claim 16, wherein said database means stores, as the accounting information, specifying information indicating which one of the storage units should be selected for each of the subscriber terminals.

18. The accounting system as claimed in claim 1, wherein said control means comprises means for causing said additional information adding means to supply the advertising image information to at least one of the subscriber terminals when said one of the subscriber terminals holds on.

19. The accounting system as claimed in claim 1, wherein:
the additional information storage means comprises advertising image information databases provided in exchange systems to which the subscribers are accommodated; and wherein
the accounting system further comprises means for supplying a calling subscriber terminal with the advertising image information from one of said advertising image information databases accommodated in one of said exchange systems in which said calling subscriber terminal is accommodated and for supplying a called subscriber terminal with the advertising image information from one of said advertising image information databases accommodated in one of said exchange systems in which said called subscriber terminal is accommodated.

20. The accounting system as claimed in claim 1, wherein said control means comprises means for causing said additional information adding means to supply the advertising image information to at least one of the subscriber terminals by a specified time.

21. An accounting system for a multimedia communications system comprising:
additional information storage means for storing additional information to be supplied to subscriber terminals in the multimedia communications system by one or a plurality of additional information suppliers;
additional information adding means for adding the additional information to communication information transmitted between subscriber terminals communicating with each other;
measurement means for measuring a degree of supply of the additional information supplied to at least one of the subscriber terminals communicating with each other;
database means for storing accounting information used to calculate a fee for a communication between the subscriber terminals communicating with each other; and
control means for calculating the fee for said communication between the subscriber terminals communicating with each other on the basis of the accounting information and the degree of supply of the additional information measured by the measurement means, wherein said control means comprises means for causing said additional information adding means to continuously supply the additional information to at least one of the subscriber terminals during the communication between said subscriber terminals.

22. The accounting system as claimed in claim 21, wherein said additional information comprises video information and speech information.

23. The accounting system as claimed in claim 22, wherein the subscriber terminals comprise multimedia terminals capable of handling video information and speech information.

24. The accounting system as claimed in claim 23, wherein each of the multimedia terminals comprises display means for displaying the video information contained in the additional information.

25. The accounting system as claimed in claim 24, wherein each of the multimedia terminals comprises means for causing the display means to display the video information contained in the additional information in a part of an entire screen area of said display means.

26. The accounting system as claimed in claim 25, wherein:

said database means stores, as the accounting information, discount rate information indicating a discount rate based on a size of said part of the entire screen area of said display means, and normal fee information indicating a normal fee to be used when no additional information is supplied to the subscriber terminals communicating with each other; and the control means comprises means for reducing the normal fee in accordance with the discount rate based on the size of said part of the entire screen area of said display means.

27. The accounting system as claimed in claim 21, further comprising input means, provided for each of the subscriber terminals, for providing said control means with supplier information indicating at least one additional information supplier from which each of the subscriber terminals requests to receive the additional information; and said control means comprises selecting means for selecting at least one additional information supplier on the basis of the supplier information provided by said input means.

28. The accounting system as claimed in claim 21, wherein said additional information storage means comprises a plurality of storage units provided in said multimedia communications system so that the additional information is decentralized in the multimedia communications system.

29. The accounting system as claimed in claim 28, wherein said database means stores, as the accounting information, specifying information indicating which one of the storage units should be selected for each of the subscriber terminals.

30. The accounting system as claimed in claim 21, wherein:

said database means stores, as the accounting information, discount rate information indicating a discount rate depending on the degree of supply of the additional information, and normal fee information indicating a normal fee to be used when no additional information is supplied to the subscriber terminals communicating with each other; and the control means comprises means for reducing the normal fee in accordance with the discount rate based on the degree of supply of the additional information measured by said measurement means.

31. The accounting system as claimed in claim 21, wherein:

said database means stores, as the accounting information, supplier information indicating at least one supplier of additional information to be selected on the basis of which subscriber terminals communicate with each other; and said control means comprises selecting means for selecting at least one supplier of additional information on the basis of the subscriber terminals communicating with each other.

32. The accounting system as claimed in claim 31, wherein:

said database means stores, as the accounting information, other supplier information indicating at least one supplier of additional information to be selected; and said selecting means of said control means selects at least one supplier of additional information on the basis of the subscriber terminals communicating with each other as well as said other supplier information.

33. The accounting system as claimed in claim 21, wherein said measurement means comprises amount-of-additional-information measuring means for measuring an amount of the additional information supplied to at least one of the subscribed terminals communicating with each other.

* * * * *

UNITED STATES PATENT AND TRADEMARK OFFICE
CERTIFICATE OF CORRECTION

PATENT NO. : 5,438,356

DATED : AUGUST 1, 1995

INVENTOR(S) : Kazumasa USHIKI, Mitsunori FUKAZAWA, and Masaaki WAKAMOTO

It is certified that error appears in the above-identified patent and that said Letters Patent is hereby corrected as shown below: On the title page, Item [22]

The filing date should read --

May 18, 1993 --

Signed and Sealed this

Thirteenth Day of February, 1996

Attest:

BRUCE LEHMAN

Attesting Officer     Commissioner of Patents and Trademarks